United States Patent
Wang

(10) Patent No.: US 6,794,468 B1
(45) Date of Patent: Sep. 21, 2004

(54) OLEFIN POLYMERIZATION PROCESS

(75) Inventor: Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/435,788

(22) Filed: May 12, 2003

(51) Int. Cl.$^7$ .................................................. C08F 4/52
(52) U.S. Cl. ...................... 526/161; 526/160; 526/170; 526/172; 526/126; 526/130; 526/129; 526/905
(58) Field of Search .................................. 526/160, 170, 526/161, 172, 126, 130, 134

(56) References Cited

U.S. PATENT DOCUMENTS

| | | | |
|---|---|---|---|
| 6,211,311 B1 | 4/2001 | Wang et al. | ................. 526/131 |
| 6,232,260 B1 | 5/2001 | Nagy et al. | ................. 502/155 |
| 6,440,889 B1 | 8/2002 | Tsuie | ......................... 502/152 |
| 6,451,724 B1 | 9/2002 | Nifant'ev et al. | ........... 502/103 |
| 6,541,583 B2 | 4/2003 | Meverden et al. | .......... 526/127 |
| 6,559,251 B1 * | 5/2003 | Wang et al. | ................. 526/127 |
| 6,583,242 B2 * | 6/2003 | Wang et al. | ................. 526/161 |

FOREIGN PATENT DOCUMENTS

| | | |
|---|---|---|
| WO | WO 99/24446 | 5/1999 |
| WO | WO 01/53360 | 7/2001 |

OTHER PUBLICATIONS

Buu–Hoi and Xuong, *J. Chem. Soc.* (1952) 2225.
Jüngling et al., *J. Organometal, Chem. 460* (1993) 191.
Noh et al., *J. Organometal. Chem. 518* (1996) 1.
Noh et al., *J. Organometal. Chem. 580* (1999) 90.

* cited by examiner

Primary Examiner—David W. Wu
Assistant Examiner—Rip A. Lee
(74) Attorney, Agent, or Firm—John A. Tyrell; Jonathan L. Schuchardt

(57) ABSTRACT

A process for polymerizing olefins is disclosed. The process combines a bridged indenoindolyl organometallic complex and an activator with a support material in the presence of an aromatic solvent. The supported catalyst containing the aromatic solvent is used to polymerize an olefin in the presence of hydrogen. Polyolefins from the process have improved flow properties.

17 Claims, No Drawings

OLEFIN POLYMERIZATION PROCESS

FIELD OF THE INVENTION

This invention relates to a process for polymerizing an olefin with a supported catalyst. The supported catalyst contains an aromatic solvent and is made from an organometallic complex comprising a Group 3 to 10 transition metal and a bridged indenoindolyl ligand bonded to the metal. The process gives polyolefins with improved flow.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. To improve polymer properties, single-site catalysts, in particular metallocenes are beginning to replace Ziegler-Natta catalysts.

Catalyst precursors that incorporate a transition metal and an indenoindolyl ligand are known. U.S. Pat. Nos. 6,232,260 and 6,451,724 disclose the use of transition metal catalysts based upon indenoindolyl ligands, but have no examples using supported catalysts. While they mention that supported catalysts may be used, little information is given about the preparation of the supported catalysts. No indication of using an aromatic solvent containing supported catalyst is given.

WO 01/53360 discloses open architecture indenoindolyl catalysts that may be supported. In the single example (Example 8) preparing a supported catalyst, a solution of the catalyst is added to a polyethylene support in 3 aliquots, and after each addition, the solvent is evaporated under vacuum.

U.S. Pat. No. 6,559,251 discloses a process for polymerizing olefins with a silica-supported, indenoindolyl Group 4–6 transition metal complex having open architecture. Volatiles are removed in the preparation of the supported catalyst. The polymers prepared with the silica supported open architecture complex have extremely high molecular weight, even when the polymerization is done in the presence of hydrogen.

U.S. Pat. No. 6,211,311 prepares supported catalysts containing heteroatomic ligands, but dries the supported catalysts under vacuum before use. U.S. Pat. No. 6,541,583 discloses a process for polymerizing propylene in the presence of a Group 3–5 transition metal catalyst that has two non-bridged indenoindolyl ligands. None of the examples uses a supported catalyst. They state that the catalyst can be immobilized on a support but give no process details and do not mention the use of an aromatic solvent.

Pending application Ser. No. 10/123,774, filed Apr. 16, 2002, discloses a process for polymerizing ethylene in the presence of a supported Group 3–10 transition metal catalyst that has two bridged indenoindolyl ligands. In each of the examples showing supported catalysts (Examples 7–12), volatiles are removed.

Despite the considerable work that has been done with catalysts based upon indenoindolyl ligands there is a need for improvement, especially with regard to regulation of flow properties. For many processing techniques, such as injection molding, an increase in flow improves the ability to melt process the polyolefin. In particular, bridged indenoindolyl catalysts generally have relatively low hydrogen sensitivity. In other words, polymer molecular weight is not easily reduced by adding hydrogen in the polymerization process. Ideally, the hydrogen sensitivity of bridged indenoindolyl catalysts could be improved, and a process could be developed that provides more control over polymer flow properties.

SUMMARY OF THE INVENTION

The invention is a process for making polyolefins with improved flow properties. An organometallic complex and an activator are combined with a support material in the presence of an aromatic solvent to prepare a supported catalyst containing the aromatic solvent. The organometallic complex comprises a Group 3 to 10 transition metal and a bridged indenoindolyl ligand that is bonded to the transition metal. The supported catalyst containing the aromatic solvent is mixed with an olefin, and the olefin is polymerized in the presence of hydrogen. The resulting polyolefins have improved flow properties.

DETAILED DESCRIPTION OF THE INVENTION

The invention is an olefin polymerization process. The process enables good control of molecular weight and improved flow.

Suitable olefins for the polymerization are $C_2$–$C_{20}$ α-olefins, such as ethylene, propylene, 1-butene, 1-hexene and 1-octene, cyclic olefins such as cyclohexene and non-conjugated dienes such as ethylidene norbornene and mixtures thereof. Preferred olefins are ethylene, propylene and mixtures thereof with α-olefins such as 1-butene, 1-hexene and 1-octene. More preferably ethylene is copolymerized with a $C_3$–$C_{20}$ α-olefin. Most preferably, ethylene is copolymerized with 1-butene, 1-hexene or 1-octene.

Hydrogen is used in the polymerization to regulate the molecular weight. The amount of hydrogen needed depends upon the desired polyolefin molecular weight and flow. Generally, as the amount of hydrogen is increased, the polyolefin molecular weight decreases and the flow increases. For many applications, the polyolefin flow will be too low if the polymerization is done in the absence of hydrogen. The olefin polymerization process enables good control of molecular weight and flow properties by use of small amounts of hydrogen.

Suitable activators include alumoxanes, anionic compounds of boron, trialkylboron and triarylboron compounds. Examples include methyl alumoxane (MAO), polymeric MAO (PMAO), ethyl alumoxane, diisobutyl alumoxane, lithium tetrakis(pentafluorophenyl) borate, dimethylanilinium tetrakis(pentafluorophenyl)borate, trityl tetrakis (pentafluorophenyl)borate, tris(pentafluorophenyl)borane, triphenylborane, tri-n-octylborane, and the like, and mixtures thereof. Preferably, the activator is methylalumoxane. Selection of activator depends on many factors including the organometallic complex used and the desired polymer properties.

The organometallic complex contains a Group 3 to 10 transition metal. Preferably the transition metal is a Group 3–5 transition metal, more preferably a Group 4 transition metal. Most preferably, the transition metal is zirconium.

The organometallic complex contains a bridged indenoindolyl ligand bonded to the transition metal. "Indenoindolyl" ligands are conveniently generated by deprotonating an indenoindole compound using a potent base. By "indenoindole compound," we mean an organic compound that has both indole and indene rings. The five-membered rings from each are fused, i.e., they share two carbon atoms. The rings can be fused such that the indole nitrogen and the only sp³-hybridized carbon on the indenyl ring are "trans" to each other. Such is the case in an indeno[1,2-b] ring system such as:

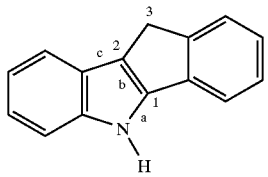

Suitable ring systems also include those in which the indole nitrogen and the sp³-hybridized carbon of the indene are beta to each other, i.e., they are on the same side of the molecule. This is an indeno[2,1-b]indole ring system:

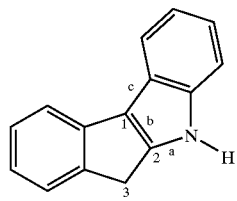

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

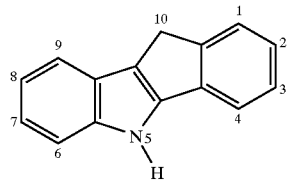

while 5,6-dihydroindeno[2,1-b]indole has the numbering:

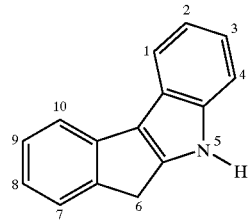

For correct nomenclature and numbering of these ring systems, see the *Ring Systems Handbook* (1998), a publication of Chemical Abstracts Service, Ring Systems File II; RF 33986-RF 66391 at RF 58952 and 58955. (Other examples of correct numbering appear in PCT Int. Appl. WO 99/24446 and U.S. Pat. No. 6,440,889.)

Methods for making indenoindole compounds are well known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appls. WO 99/24446 and WO 01/53360.

The indolyl nitrogen of each indenoindolyl group is typically substituted with an alkyl, aryl, dialkylboryl, trialkylsilyl, or a divalent linking group.

By "bridged indenoindolyl ligand," we mean that the bridged indenoindolyl group can be joined to a second ligand by a divalent linking group. A wide variety of linking groups are suitable for use and are described in the art. The linking group can be a conjugated pi-electron system, but it need not be conjugated. Suitable divalent linking groups include dialkylsilyl, diarylsilyl, alkylboranyl, arylboranyl, siloxy, polysiloxy, and hydrocarbyl groups. Preferred hydrocarbyl groups are alkylene, dialkylene, polyalkylene, arylene, diarylene, polyarylene, cycloalkyl, adamantyl, aralkylene, alkenyl, and alkynyl. Specific examples of suitable divalent linking groups are methylene, 1,2-dimethylene, polymethylene, 1,2-ethenyl, 1,2-ethynyl, isopropylidene, 1,4-phenylene, α,α'-xylyl, 4,4'-biphenylene, 1,3-adamantyl, 1,4-adamantyl, phenylboranyl, methylboranyl, dimethylsilyl, diphenylsilyl, bis (dimethylsilyl), oxybis(dimethylsilyl), and the like. These and other divalent linking groups are described in the background references. (For some examples, see *J. Organometal. Chem.* 460 (1993) 191; 518 (1996) 1; 580 (1999) 90.)

The divalent linking group can link the indenoindolyl ligand to a polymerization-stable ligand. Suitable polymerization-stable ligands include cyclopentadienyl, indenyl, fluorenyl, boraaryl, indenoindolyl, and the like.

Bridged indenoindolyl ligands also include those used in open architecture complexes. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indolyl nitrogen or the indenyl methylene carbon. Preferably, the metal is sigma-bonded to a heteroatom, i.e., oxygen, nitrogen, phosphorus, or sulfur; most preferably, the metal is sigma-bonded to nitrogen. The heteroatom is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to either the indolyl nitrogen atom or the indenyl methylene carbon.

Preferred bridged indenoindolyl ligands have a structure selected from the group consisting of:

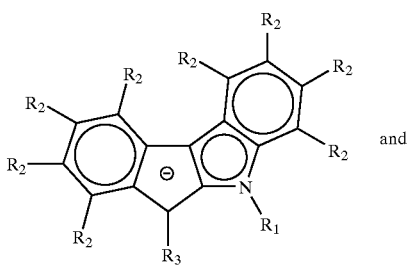

and

-continued

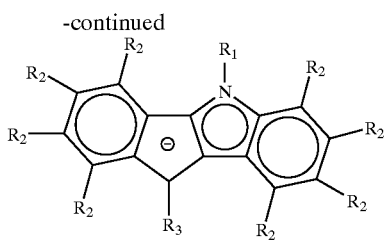

in which $R_1$ is selected from the group consisting of $C_1$–$C_{30}$ hydrocarbyl, dialkylboryl, trialkylsilyl, and divalent radicals connected to a second ligand; each $R_2$ is independently selected from the group consisting of $R_1$, H, F, Cl and Br; $R_3$ is selected from the group consisting of $R_2$ and divalent radicals connected to a second ligand with the proviso that one of $R_1$ or $R_3$ is a divalent radical connected to a second ligand wherein the divalent radical is selected from the group consisting of hydrocarbyl and heteroatom containing alkylene radicals, diorganosilyl radicals, diorganogermanium radicals and diorganotin radicals.

Additionally, the complex includes ancillary ligands that are bonded to the metal and satisfy the valence of the metal. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, benzyl).

In a preferred process of the invention, the bridged indenoindolyl complex has the general structure:

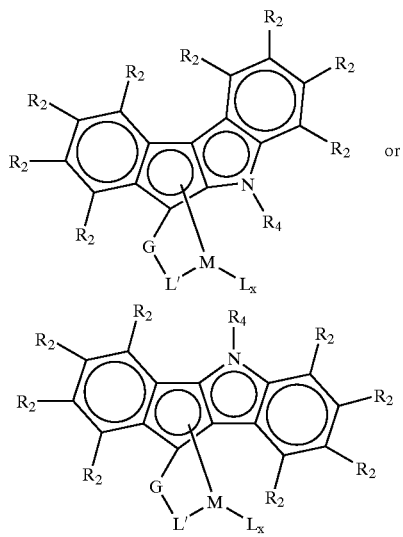

wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_4$ is selected from the group consisting of $C_1$–$C_{30}$ hydrocarbyl, dialkylboryl and trialkylsilyl; each $R_2$ is independently selected from the group consisting of $C_1$–$C_{30}$ hydrocarbyl, H, F, Cl and Br; G is a divalent radical is selected from the group consisting of hydrocarbyl and heteroatom-containing alkylene radicals, diorganosilyl radicals, diorganogermanium radicals and diorganotin radicals.

In another preferred process of the invention, the bridged indenoindolyl complex has the general structure:

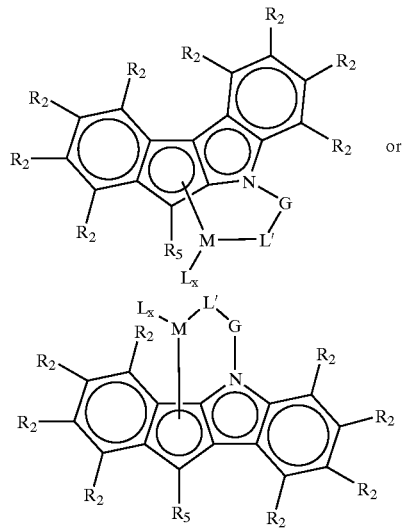

wherein M is a Group 3 to 10 transition metal; each L is independently selected from the group consisting of halide, alkoxy, aryloxy, siloxy, alkylamino, and $C_1$–C30 hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_5$ is selected from the group consisting of $C_1$–$C_{30}$ hydrocarbyl and H; each $R_2$ is independently selected from the group consisting of $R_5$, F, Cl and Br; G is a divalent radical is selected from the group consisting of hydrocarbyl and heteroatom containing alkylene radicals, diorganosilyl radicals, diorganogermanium radicals and diorganotin radicals.

The complexes can be made by any suitable method; those skilled in the art will recognize a variety of acceptable synthetic strategies. Often, the synthesis begins with preparation of the desired indenoindole compound from particular indanone and arylhydrazine precursors. Treatment with base gives a ligand precursor. The indenoindole is linked with a second polymerization-stable ligand to give a linked ligand precursor. The final step normally involves reaction of the ligand precursor with a transition metal source to give the organometallic complex. The exact synthetic steps and the sequence used will normally depend upon the other ligands used and the transition metal source.

The process combines the organometallic complex and an activator with a support material in the presence of an aromatic solvent. The support material is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Most preferably, the support is silica.

Preferably the silica has a surface area in the range of about 10 to about 1000 m$^2$/g, more preferably from about 50 to about 800 m$^2$/g and most preferably from about 200 to about 700 m$^2$/g. Preferably the pore volume of the silica is in the range of about 0.05 to about 4.0 mL/g, more preferably from about 0.08 to about 3.5 mL/g, and most preferably from about 0.1 to about 3.0 mL/g. Preferably, the average particle size of the silica is in the range of about 1 to about 500 μm, more preferably from about 2 to about 200 μm, and most preferably from about 5 to about 100 μm. The average pore diameter is typically in the range of about 5 to about 1000 angstroms, preferably about 10 to about 500 angstroms, and most preferably about 20 to about 350 angstroms. Preferably the silica is dried before use. Preferably the drying is done at a temperature of from 100° C. to about 600° C., more preferably from about 150° C. to about 400° C.

The amount of activator per support can be varied. If the amount is too low, impurities can consume the activator and the resultant catalyst has poor activity. If the amount is too high, it adds to the cost and there is no benefit. Preferably, the activator is an alumoxane and the support material is silica. Preferably the alumoxane is used at a level such that there is between 0.005 to 1.5 g Al per gram silica. More preferably, there is 0.01 to 1.0 g Al per gram silica and most preferably 0.1 to 0.5 g Al per gram silica.

The solvent is an aromatic solvent. The solvent should be aprotic since protic solvents will react with the activator. Preferably, the aromatic solvent is a hydrocarbon that dissolves the activator. Preferably, the aromatic solvent will dissolve both the organometallic complex and the activator. Depending upon the solubility of the organometallic complex and the activator, aromatic hydrocarbons such as toluene or xylene may be used. A preferred aromatic solvent is toluene.

Preferably, the aromatic solvent is present in the supported catalyst at a level of from about 5% to about 50% by weight. More preferably, the aromatic solvent is present at a level of from about 20% to about 40% by weight. Preferably, the supported catalyst containing the aromatic solvent is a free-flowing solid. With large levels of aromatic solvent, the support is not a free-flowing solid. If the level of aromatic solvent is too low, the beneficial effect on polyolefin flow properties is not seen.

The amount of organometallic complex in solution added per g support material is preferably from 0.01 mmol per gram to 0.5 mmol per gram. The amount of organometallic complex added per amount of activator added to the support can be varied. When the activator is an alumoxane, preferably, there is 1 to 1000 g Al per g transition metal. More preferably there is 2 to 200 and most preferably 10 to 100 g Al per g transition metal.

The mixture is stirred in an inert atmosphere at a temperature of from 0° C. to about 120° C., more preferably from about 20° C. to about 40° C. The optimum stirring time will vary somewhat, depending upon the amounts of aromatic solvent and support material, but should be long enough to ensure good mixing. Preferably, the stirring time is from about 2 minutes to about 60 minutes. Stirring longer than 60 minutes should not decrease activity, but it is unnecessary. Stirring 30 minutes at room temperature is convenient and gives good results.

Preferably, a scavenging amount of an alkyl aluminum compound such as triethyl aluminum or triisobutyl aluminum is also added to the reactor. Preferably, the alkyl aluminum compound is added to the reactor prior to the addition of the supported catalyst containing the aromatic solvent.

A wide variety of olefin polymerization processes can be used. Preferred processes are slurry, bulk, solution, and gas-phase processes. A slurry or gas-phase process is preferably used.

The polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psia to about 50,000 psia. More preferred is the range from about 15 psia to about 1000 psia.

Catalyst concentrations used for the olefin polymerization depend on many factors. Preferably, however, the concentration ranges from about 0.01 micromoles transition metal per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Synthesis of [1,1-Dimethyl-1-(cyclopentadienyl) silyl]-5,6-dihydrido-5-methyl-indeno[2,1-b] indolylzirconium dichloride, 5

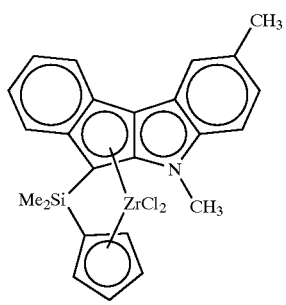

(a) Preparation of Indeno[2,1-b]indole 1. A mixture of 2-indanone (51.0 g, 0.39 mol) and p-tolylhydrazine hydrochloride (61.4 g, 0.39 mol) is dissolved in glacial acetic acid (525 mL) and is vigorously stirred and heated to reflux. The mixture turns red and is heated for 2 hours. After cooling to room temperature, it is poured into ice water (1 L). The precipitate is filtered to afford a solid, which is washed with water (about 1 L). The solid is dissolved in ethyl acetate (1.4 L), activated charcoal is added, and the mixture is gently warmed. The mixture is then cooled and filtered over a pad of Celite. The filtrate is dried over sodium sulfate, filtered, and is then concentrated to 450 mL and cooled to −30° C. for 3 days. The crystalline, solid is filtered and washed with chilled (−78° C.) hexanes (2×500 mL). The beige solid is collected and dried under vacuum (47.1 g, 56%).

(b) N-Methylation of 1 to give 2. A slurry of aqueous NaOH (42 mL, 21.5 M, 903 mmol), $C_{16}H_{33}NMe_3Br$ (0.36 g, 0.97 mmol), and 1 (15.0 g, 68.4 mmol) is combined with toluene (50 mL). A solution of methyl iodide (8.0 mL, 129 mmol) in toluene (15 mL) is added dropwise at room temperature. The mixture is stirred at room temperature for 2.5 hours and then refluxed for an hour. The mixture turns red and is cooled to room temperature and filtered. The crystalline solid is washed with chilled (−30° C.) ethanol (200 mL) followed by chilled hexanes (200 mL) to afford a pale red solid (10.3 g, 65%).

(c) Anion generation: Preparation of 3. n-Butyllithium (13.0 mL, 2.5 M in hexanes, 32.5 mmol) is added at room temperature to a slurry of 2 (4.94 g, 21.1 mmol) in toluene (125 mL). The mixture is maintained at room temperature and turns pale yellow. A precipitate forms after 2 hours. After 2 days, the mixture is filtered to give a pale beige solid. The solid is washed with toluene (60 mL), followed by hexanes (30 mL), and is then collected and dried under vacuum (4.37 g, 87%).

(d) Preparation of Dianion 4. Product 3 (4.57 g, 19.1 mmol) is suspended in toluene (100 mL). Diethylether (40 mL) is added dropwise to afford an orange solution, which is added to a solution of SiCl$_2$Me$_2$ (12.0 mL, 98.9 mmol) in diethylether (100 mL) at room temperature. The mixture turns cloudy and dirty beige and is stirred for 3 days and filtered to give a dark red-orange solution. Volatiles are removed under reduced pressure to afford an oily solid. An aliquot is analyzed by $^1$H NMR, revealing formation of the desired product, 100% conversion is presumed. The oily solid is dissolved in diethylether (140 mL), and sodium cyclopentadienide (11.0 mL, 2.0 M in tetrahydrofuran, 22 mmol) is added. A precipitate forms immediately, and stirring continues for 2 days. The mixture is washed with water (3×50 mL), and the organic phase is dried over sodium sulfate and filtered. Volatiles are removed under vacuum to give an oily residue, and 100% conversion is assumed. The residue was dissolved in diethylether (75 mL) and cooled to −78° C. n-Butyllithium (18.0 mL, 2.5 M in hexanes, 45.0 mmol) is added by syringe, and the mixture is warmed to room temperature slowly. A yellow solid precipitates overnight, and volatiles are removed under vacuum. The crude material is washed with hexanes (100 mL) and filtered to afford a yellow powder. The powder is collected and dried under vacuum (6.73 g, 93%).

(e) Preparation of Complex 5: Zirconium tetrachloride (3.15 g, 13.5 mmol) is combined with toluene (100 mL) and dissolved in diethylether (50 mL) to produce a cloudy suspension. Dianion 4 (5.02 g, 13.7 mmol) is added as a solid in portions over the course of 30 min. The color turns from yellow to dark orange, and a precipitate forms. The mixture is maintained at room temperature for 2 days and is filtered to give a dirty yellow solid. The solid is washed with toluene (50 mL) and hexanes (50 mL). The yellow powder is collected and dried under vacuum (3.72 g, 53%).

EXAMPLE 2

Preparation of Silica-supported Catalyst

In a glove-box under nitrogen, 3.1 mL of 30 wt. % of methylalumoxane (MAO) in toluene is mixed with 45.1 mg (0.084 mmol) complex 5 from Example 1 to make a deep red solution. This solution is then slowly added at room temperature to 2.00 g of Crosfield ES757 silica, which was calcined at 600° C. for 12 hours with efficient stirring. After the addition is complete, stirring continues at room temperature for 0.5 hour. Total weight of the produced supported catalyst is 4.97 g. It is a free-flowing powder containing toluene.

COMPARATIVE EXAMPLE 3

A sample of the "wet" catalyst from Example 2 (3.67 g) is dried. After removing volatiles by vacuum (about 28.5 inches Hg, 2 hour) at room temperature, 2.37 g dried catalyst is obtained and is tested as the control catalyst.

EXAMPLE 4

Copolymerization of Ethylene and 1-Hexene

A one-liter, stainless-steel reactor is charged with 1-hexene (75 mL). Triisobutylaluminum (1.0 mL of 1.0 M solution in heptane, 1.0 mmol) and Stadis fatty amine (12 mg, product of Akzo Nobel) in heptane solution (3.0 mL) are mixed in one sidearm of the injector. This mixture is then flushed into the reactor with nitrogen pressure and isobutane (about 350 mL). Hydrogen is added (120 dpsig from a 10-mL stainless-steel cylinder pressurized initially to 500 psig H$_2$) to the reactor, which is then pressurized with ethylene to 356 psig. The reactor contents are allowed to equilibrate at 75° C. The supported catalyst from Example 2 (25–27 mg) is loaded into the other injector arm and then flushed into the reactor with isobutane (75 mL) and nitrogen pressure. The polymerization proceeds for 0.5 hour. The reactor is vented and the polyolefin copolymer is collected and dried. Catalyst activity is 5,440 kg polyolefin per g zirconium per hour. The weight average ($M_w$) molecular weight and polydispersity ($M_w/M_n$) of the polymer were measured by gel permeation chromatography (GPC) using 1,3,5-trichlorobenzene at 145° C. to be 78,000 and 2.9. The melt index (MI) was measured according to ASTM D-1238, Condition E to be 4.1 dg/min.

EXAMPLE 5

Copolymerization of Ethylene and 1-Hexene with Less Hydrogen

The polymerization procedure of Example 4 was generally followed with a fifty percent reduction in the amount of hydrogen (60 dpsig from a 10-mL stainless-steel cylinder pressurized initially to 500 psig H$_2$). The catalyst activity is 4,560 kg polyolefin per g zirconium per hour.

COMPARATIVE EXAMPLE 6

Copolymerization of Ethylene and 1-Hexene

The polymerization procedure of Example 4 was generally followed except that the supported catalyst (0.018 g) from Comparative Example 3 was used in place of the catalyst from Example 2. The catalyst activity is 5,010 kg polyolefin per g zirconium per hour.

The results of the polymerizations are summarized in Table 1.

TABLE 1

| | | Polymerizations | | | |
|---|---|---|---|---|---|
| Example | Catalyst Version | H$_2$ [dpsi × mL] | MI | Mw | Mw/Mn |
| 4 | Not dried | 120 × 10 | 4.1 | 78,000 | 2.9 |
| 5 | Not dried | 60 × 10 | 0.88 | 98,000 | 2.7 |
| C6 | Dried by vacuum | 120 × 10 | 0.90 | 96,000 | 2.9 |

Example 4 shows that by using a supported catalyst containing toluene, the molecular weight is reduced and MI is increased versus Comparative Example 6. These results show that the polymer from Example 4 has improved flow properties.

Example 5 shows that by using a supported catalyst containing toluene, the same flow is achieved as Comparative Example 6 with only about half of the amount of hydrogen as used in Comparative Example 6.

The preceding examples are meant only as illustrations. The following claims define the invention.

I claim:
1. A process for polymerizing an olefin which comprises:
(a) combining an organometallic complex and an activator with a support material in the presence of an aromatic solvent to prepare a supported catalyst containing the aromatic solvent wherein the organometallic complex comprises a Group 3 to 10 transition metal, M, and a bridged indenoindolyl ligand that is bonded to M and wherein the activator is selected from the group consisting of alumoxanes, organoboranes and ionic borates;

(b) mixing the supported catalyst containing the aromatic solvent with an olefin; and (c) polymerizing the olefin in the presence of hydrogen.

2. The process of claim 1 wherein the aromatic solvent is present at a level of from about 5% to about 50% by weight of the supported catalyst containing the aromatic solvent.

3. The process of claim 2 wherein the aromatic solvent is present at a level of from about 20% to about 40% by weight.

4. The process of claim 1 wherein the aromatic solvent is toluene.

5. The process of claim 1 wherein the support material is silica.

6. The process of claim 1 wherein the Group 3 to 10 transition metal is a Group 4 transition metal.

7. The process of claim 1 wherein the activator is methylalumoxane.

8. The process of claim 1 wherein the olefin is selected from the group consisting of ethylene, propylene, 1-butene, 1-pentene, 1-hexene and 1-octene and mixtures thereof.

9. The process of claim 8 wherein the olefin is ethylene in combination with a second olefin selected from the group consisting of 1-butene, 1-hexene and 1-octene.

10. The process of claim 1 wherein the polymerization is performed at a temperature within the range of about 20° C. to about 100° C.

11. A slurry polymerization of claim 1.

12. A gas-phase polymerization process of claim 1.

13. The process of claim 1 wherein the bridged indenoindolyl ligand has a structure selected from the group consisting of:

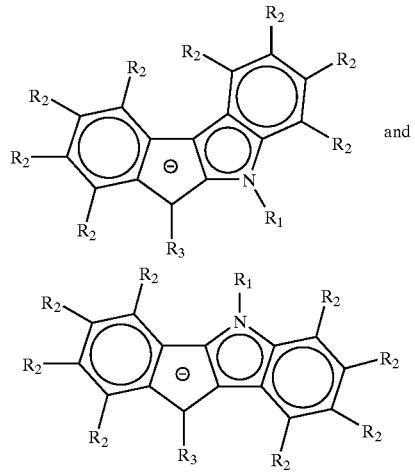

in which $R_1$ is selected from the group consisting of $C_1$–$C_{30}$ hydrocarbyl, dialkylboryl, trialkylsilyl and divalent radicals connected to a second ligand; each $R_2$ is independently selected from the group consisting of $C_1$–$C_{30}$ hydrocarbyl, H, F, Cl and Br; $R_3$ is selected from the group consisting of $R_2$ and divalent radicals connected to a second ligand wherein one of $R_1$ or $R_3$ is a divalent radical selected from the group consisting of hydrocarbyl and heteroatom containing alkylene radicals, diorganosilyl radicals, diorganogermanium radicals and diorganotin radicals.

14. The process of claim 1 wherein the organometallic complex has a structure selected from the group consisting of:

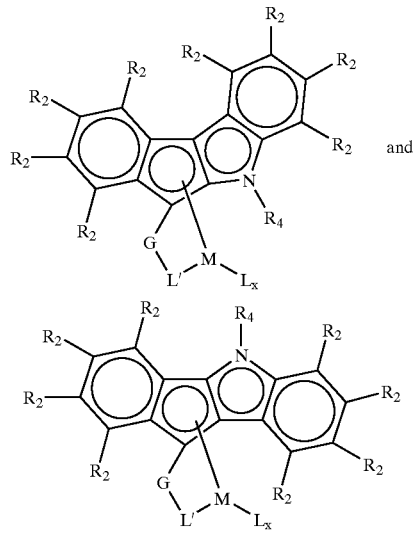

wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_4$ is selected from the group consisting of $C_1$–$C_{30}$ hydrocarbyl. dialkylboryl and trialkylsilyl; each $R_2$ is independently selected from the group consisting of $C_1$–$C_{30}$ hydrocarbyl, H, F, Cl and Br; G is a divalent radical selected from the group consisting,of hydrocarbyl and heteroatom containing alkylene radicals, diorganosilyl radicals, diorganogermanium radicals and diorganotin radicals.

15. The process of claim 14 wherein L' is selected from the group consisting of substituted or unsubstituted cyclopentadienyl, fluorenyl, indenyl, and indenoindolyl.

16. The process of claim 1 wherein the organometallic complex has a structure selected from the group consisting of:

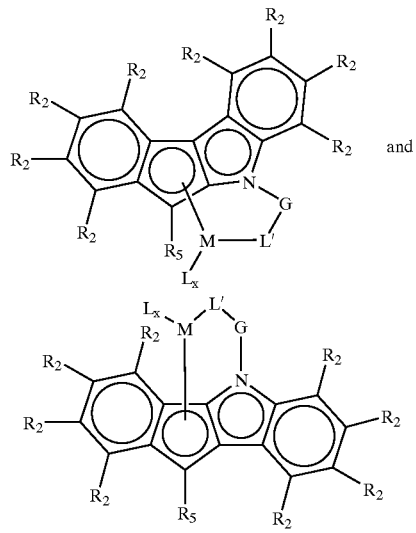

wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_5$ is selected from the group consisting of $C_1$–$C_{30}$ hydrocarbyl and H; each $R_2$ is independently selected from the group consisting of $R_5$, F, Cl and Br; G is a divalent radical selected from the group consisting of hydrocarbyl and heteroatom containing alkylene radicals, diorganosilyl radicals, diorganogermanium radicals and diorganotin radicals.

17. The process of claim 16 wherein L' is selected from the group consisting of substituted or unsubstituted cyclopentadienyl, fluorenyl, indenyl, and indenoindolyl.

\* \* \* \* \*